June 18, 1968 P. L. ANDERSSON 3,388,858

TAPE PUNCHING KEYBOARD APPARATUS

Filed June 13, 1966 7 Sheets-Sheet 1

INVENTOR
PER LENNART ANDERSSON

BY Cushman, Darby & Cushman
ATTORNEYS

INVENTOR
PER LENNART ANDERSSON
BY Cushman, Darby & Cushman
ATTORNEYS

TAPE PUNCHING KEYBOARD APPARATUS

Filed June 13, 1966 7 Sheets-Sheet 3

INVENTOR
PER LENNART ANDERSSON

BY Cushman, Darby & Cushman
ATTORNEYS

TAPE PUNCHING KEYBOARD APPARATUS

INVENTOR
PER LENNART ANDERSSON

BY Cushman, Darby & Cushman
ATTORNEYS

June 18, 1968 P. L. ANDERSSON 3,388,858

TAPE PUNCHING KEYBOARD APPARATUS

Filed June 13, 1966 7 Sheets-Sheet 5

INVENTOR
PER LENNART ANDERSSON

BY Cushman, Darby & Cushman
ATTORNEYS

TAPE PUNCHING KEYBOARD APPARATUS

Filed June 13, 1966 7 Sheets-Sheet 6

INVENTOR
PER LENNART ANDERSSON

BY Cushman, Darby & Cushman
ATTORNEYS

TAPE PUNCHING KEYBOARD APPARATUS

Filed June 13, 1966 7 Sheets-Sheet 7

INVENTOR
PER LENNART ANDERSSON

BY Cushman, Darby & Cushman
ATTORNEYS

United States Patent Office 3,388,858

Patented June 18, 1968

3,388,858

TAPE PUNCHING KEYBOARD APPARATUS

Per Lennart Andersson, Berwyn, Pa., assignor to United States Banknote Corporation, New York, N.Y., a corporation of Virginia Filed June 13, 1966, Ser. No. 557,094
10 Claims. (Cl. 234—23)

ABSTRACT OF THE DISCLOSURE

A keyboard apparatus including a multiplicity of keys of the order of 236, a 6 channel tape punching mechanism and electrical circuitry operable in response to a single push of a single key for actuating the tape punching mechanism (1) to punch the character code signal associated with the key pushed on a separate punch line, (2) to adjacently punch a shift or unshift precedent code signal only if the shift or unshift precedent code signal associated with the preceded key pushed is different and (3) to adjacently punch a rail or offrail precedent code signal only if the rail or offrail precedent code signal associated with the preceding key pushed is different.

This application relates to apparatus for punching code signals in tape and more particularly to a keyboard apparatus in which a distinct command code signal is punched in response to one push of one key.

The keyboard apparatus of the present invention is capable of producing unjustified punched tape to be fed to a computer capable of producing a justified punched tape which may be utilized to operate a typesetting machine either of the type casting or line casting variety or a photocomposing machine. The utilization of computers to produce a justified punched tape from an unjustified punched tape is becoming more widespread in the graphic arts industry due to the saving in keyboard operator time which can be achieved by eliminating the necessity of the keyboard operator to justify and hyphenate each line during keyboard operation. It has been estimated that a theoretical saving of operator time of approximately 40% can be obtained, although in actual operation a saving of probably not more than 25% can actually be obtained. In any event, saving of keyboard operator time is becoming more and more important because of the lack of available skilled keyboard operators.

The most common useage of computers in this regard is in connection with the six-channel tape produced by a Teletypesetter keyboard. Computers have been programmed to accept the six-channel tape produced by a Teletypesetter keyboard without a line ending signal and to produce a punched tape having the proper line ending signal inserted therein. The most common useage of the tape produced by the computer is to operate a line casting machine. It will be understood, however, that a computer which accepts, for example, a six-channel unjustified tape produced by a Teletypesetter keyboard, is capable of being programmed to produce a justified tape for operating a typesetting machine, such as a Monotype type caster, or a photocomposing machine. In view of the availability of computers which will accept the six-channel unjustified tape produced by a Teletypesetter keyboard, the keyboard apparatus of the present invention is also adapted to produce a similar tape.

The Teletypesetter keyboard is a keyboard having 64 keys. All but a few of the keys are associated with a distinct character code signal. A few of the keys are associated with a distinct precedent code signal which makes it possible to multiply the total number of discrete command code signals (a precedent code signal plus a character code signal) which can be produced by the keyboard. By utilizing 4 of the keys as precedent code signal keys, in the case of a 64 key keyboard, 4×60 or 360 distinct command code signals can be produced. The Teletypesetter keyboard, since it is normally utilized to produce punched tape for operating a line casting machine, utilizes 4 precedent code signals usually referred to as shift, unshift, rail and offrail. A total command code signal includes a rail or offrail precedent code signal, a shift or unshift precedent code signal, and a character code signal. The precedent code signal is punched prior to the punching of the character code signal only when there is a change in the shift or unshift position or in the rail or offrail position.

By providing only the number of keys equal to the maximum number of character code signals available, it follows that the character code associated with each key will produce a different command code signal depending upon the particular precedent code signal associated therewith. Each key is therefore capable of producing one of four command code signals. Consequently, it is necessary for the operator to know each of the 4 command code signals associated with each key. In the case of letter characters, this knowledge can be supplied quite simply by a single indicia on the key. For example, a key marked "A" can be utilized to always produce an "A" character code signal, the particular precedent code signal being utilized to determine whether the "A" will be lower case Roman, as in the rail-unshift position, an upper case Roman, as in the rail-shift position, a lower case bold or italic, as in the offrail-unshift position, and an upper case bold or italic, as in the offrail-shift position.

However, there are numerous keys of the keyboard where the particular character involved will not be the same in the shift, unshift, rail or offrail position.

Heretofore, it has been the practice to mark such keys only with the unshift-offrail and shift-offrail markings. It can thus be seen that in the normal operation of a keyboard of this type, there are numerous character signals available in the rail-unshift and rail-shift positions which contain no key indications. Where these characters are required in the operation of the keyboard, the operator must either have developed sufficient skill to remember the particular character associated with the particular key or he must consult a manual. The first alternative requires considerable operator skill, and both require considerable operator time. Moreover, the requirement that the operator must push a separator precedent code signal key places a limitation on the operating speed.

The present invention is based upon the fundamental principle that a substantial decrease in operator time and a substantial decrease in the required operator skill can be obtained by the provision of a keyboard which provides for a separate key for producing each separate command code signal. This saving in time is achieved in the case of tape produced for operating line casting machines first by providing a separate key with indicia thereon corresponding with the distinct command code signal associated therewith. This eliminates the need for an operator to spend time in consulting a manual or developing the memory skills required as indicated above. Moreover, by providing a keyboard apparatus which is capable of automatically producing a three-punch line command code signal in response to a single push of a single key, operator time is saved in comparison with the time heretofore required for the operator to push three keys to produce the same command code signal.

Accordingly, it is an object of the present invention to provide a keyboard apparatus of the type described in which one push of one key will result in the automatic punching of a discrete command code signal which may be comprised of one or more punch lines, the operation of the punching mechanism to punch the tape to obtain the entire command code signal being automatic without the necessity of pushing more than one key.

Another object of the present invention is the provision of an apparatus of the type described having improved means for punching a precedent code signal or signals in association with a character code signal only when the precedent code signal or signals associated with the preceding character code signal differs from the precedent code signal or signals associated with the character code signal being punched.

A further object of the present invention is the provision of an apparatus of the type described having improved electrical interlock means for delaying the punching of the character code signal when one or more precedent code signals are to be punched until the punching of the precedent code signals have been accomplished.

Still another object of the present invention is the provision of an apparatus of the type described having means for punching two precedent code signals in association with each character code signal and means for automatically selectively punching one or two precedent code signals prior to the punching of the character code signal only when one or both of the precedent code signals of the associated character code signal differs from the precedent code signals associated with the character code being punched.

Another object of the present invention is the provision of a keyboard apparatus of the type described wherein the mechanical movements of the keys are transmitted to mechanical movements of the punch mechanism through electrical circuitry which is capable of solid state construction thereby rendering the apparatus capable of economic, compact construction and yet effective and efficient operation with a minimum of maintenance.

These and other objects of the present invention will become more apparent during the course of the following detailed description and appended claims.

The invention may best be understood with reference to the accompanying drawings wherein an illustrative embodiment is shown.

Figure 1:
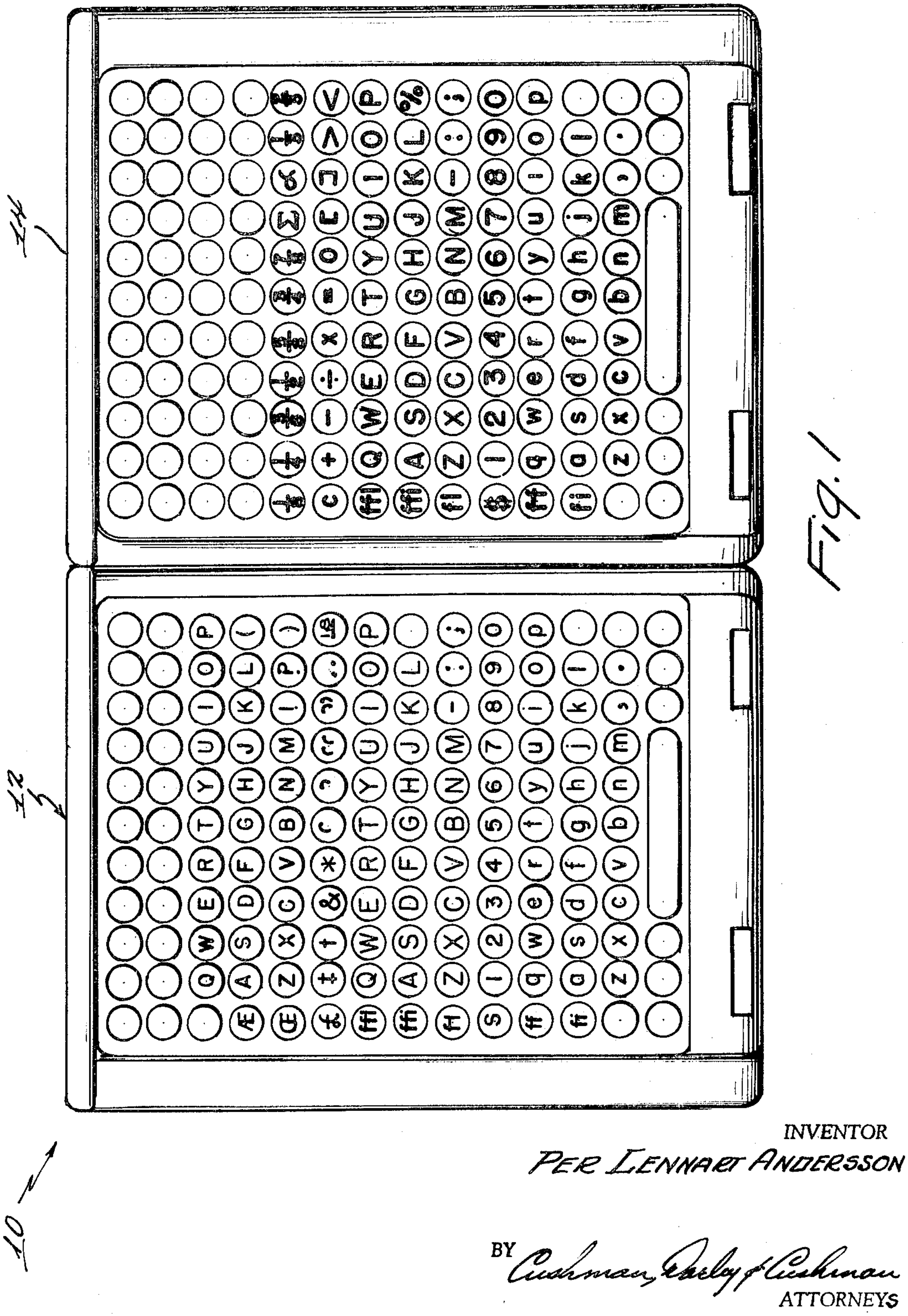
FIGURE 1 is a diagrammatic view of the keys of a keyboard apparatus embodying the principles of the present invention.

Referring now more particularly to the drawings, there is shown in FIGURE 1 a keyboard apparatus, generally indicated at 10, embodying the principles of the present invention, the keyboard apparatus including a lefthand bank of keys, generally indicated at 12, and a righthand bank of keys, generally indicated at 14. Each bank of keys in general includes a multiplicity of keys arranged in rows and columns and, as shown, each bank includes fourteen rows and eleven columns of keys.

In accordance with the principles of the present invention, each key is associated with only one command code signal or symbol. The symbol may be alphabetical, numerical, punctuation signs, ligatures, accents, or any other type of useful symbol. In the embodiment shown in FIGURE 1, a five alphabet grouping of characters is applied to the keys which includes upper and lower case Roman, upper and lower case italic, small caps, figures, ligatures, and punctuation signs, utilizing approximately 236 of the total number of keys provided. It will be understood that the arrangement shown is exemplary only.

Figure 2:
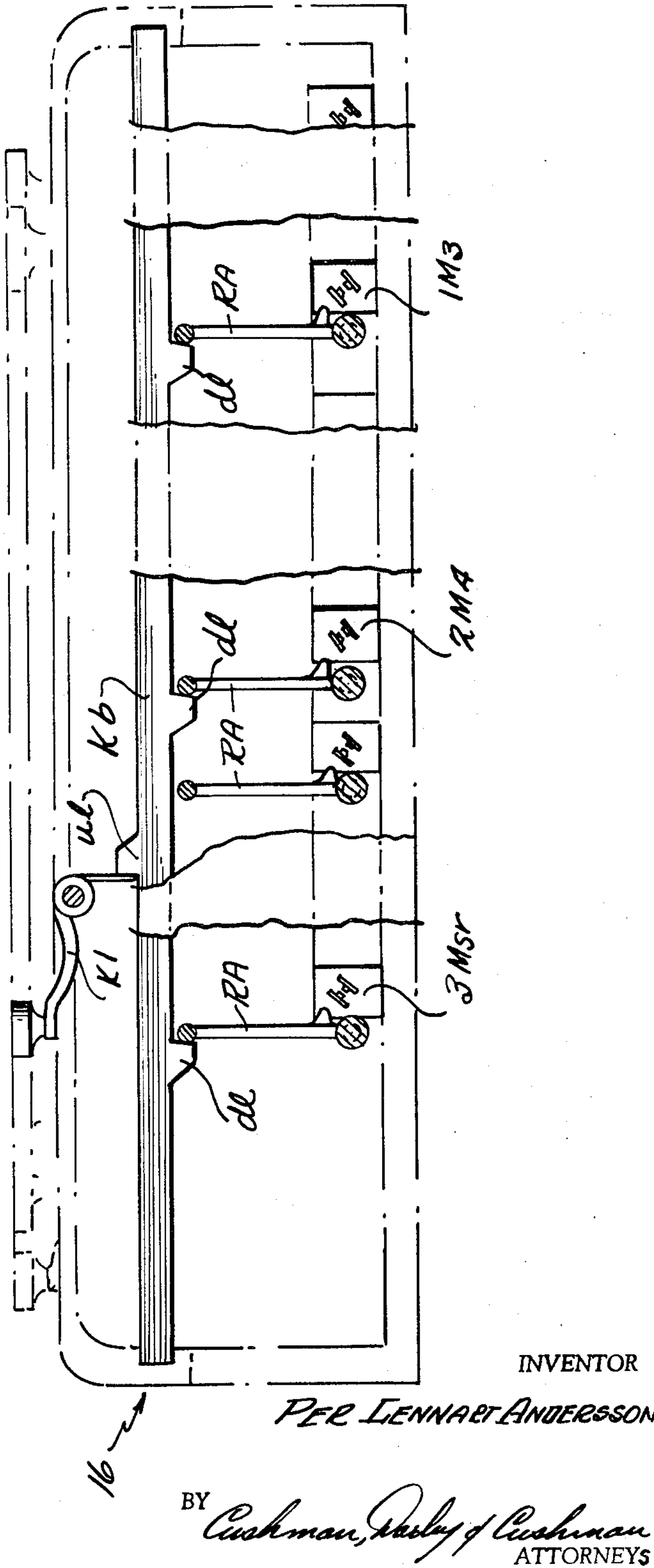
FIGURE 2 is a schematic perpsective view illustrating the mechanical movements occasioned by the single push of a single key for effecting operation of the actuating switches of the electric circuit.

Referring now more particularly to FIGURE 2, the keyboard apparatus 10 of the present invention includes a motion transmitting mechanism, generally indicated at 16, associated with each key for effecting actuation of an electric circuit, generally indicated at 18, as shown in FIGURE 5. Actuation of the electric circuit 18 through movement of the keys results in the actuation of a tape punching mechanism, generally indicated at 20, illustrated schematically in FIGURE 3.

Figures 3, 4:
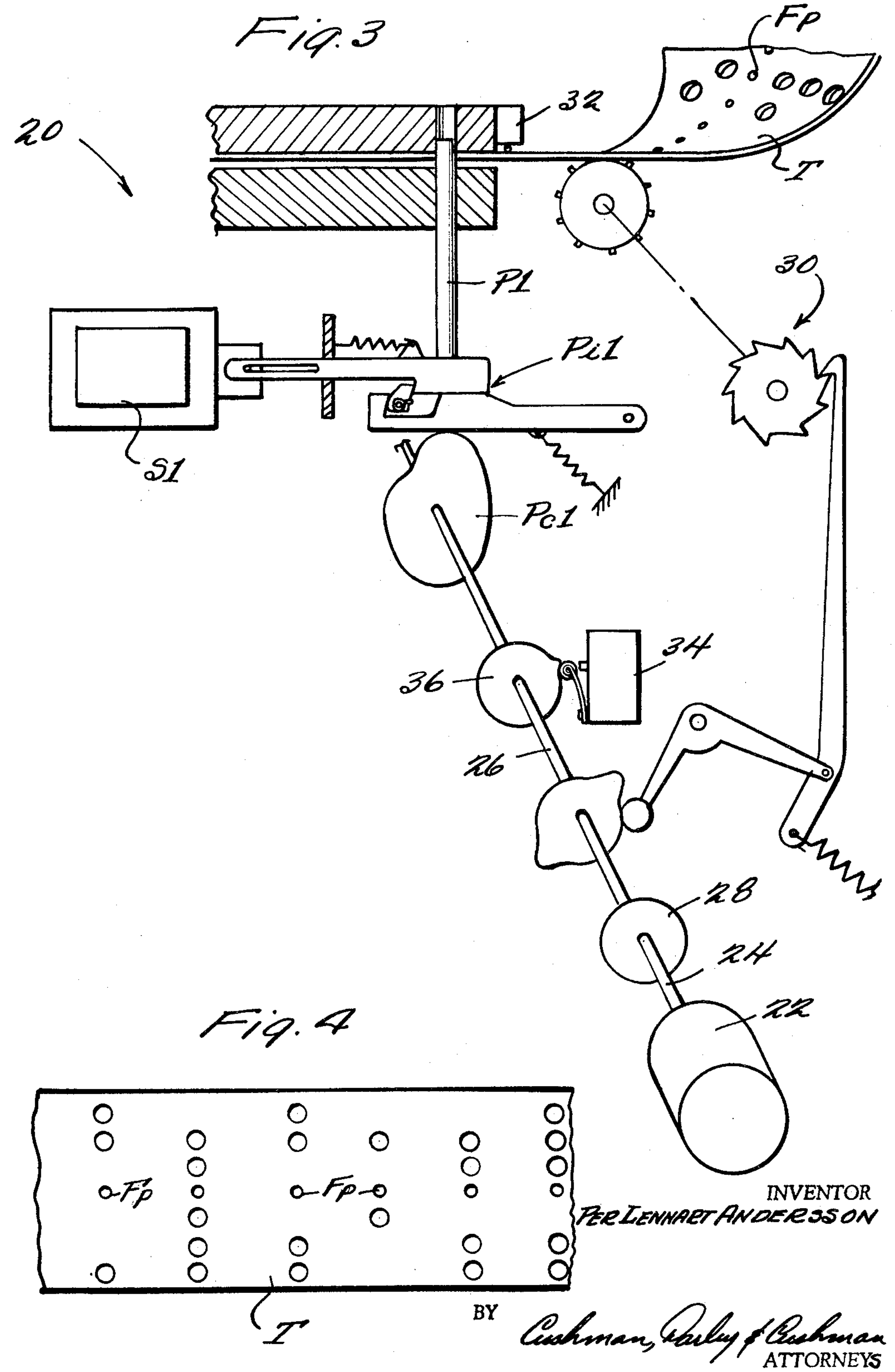
FIGURE 3 is a diagrammatic perspective view illustrating the mechanical movements of a single punch of the punch mechanism in response to the energization of the actuating solenoids thereof by the electric circuit.
FIGURE 4 is a fragmentary plan view of a portion of the tape produced by the keyboard apparatus of the present invention.

As shown in FIGURE 3, the tape punching mechanism is capable of producing a tap T having six punch channels therein, three channels, designated by the reference numerals 1, 2 and 3, respectively, being disposed on one side of a centrally located feed perforation *Fp* and three punch channels, designated by the reference numerals 4, 5 and 6, respectively, being disposed on the opposite side thereof.

As best shown in FIGURE 2, the key actuated motion transmitting mechanism 16 comprises a plurality of groups of rocker arms, designated by the general reference character RA, mounted within the frame of the associated key bank for pivotal movement about parallel transverse horizontal axes. Each rocker arm is normally biased into a generally vertically extending position and is movable from such position into an actuating position to close the contacts of an associated switch, designated by the general reference character M. The rocker arms are moved from their normally biased position into their actuating position by means of lugs, generally indicated by the reference character *dl*, depending from a key bar, generally indicated by the reference character *kb*, mounted for reciprocating movement within the associated key bank frame in a direction fore and aft, there being a key bar *kb* associated with each key. Each key bar also includes an upstanding lug, generally indicated by the reference character *ul*, which is adapted to be engaged by one arm of a key lever, generally indicated by the reference character *kl*, which is pivotally mounted intermediate its ends within the respective key bank for pivotal movement about a horizontal transverse axis. The opposite end of each key lever *kl* carriers a key button which is normally spring biased into an inoperable position for movement downwardly from such position by a digital push by the operator.

The switches M are associated generally into three main groups, each group being designated by the preceding common reference numerals 1, 2 and 3 respectively. Each key bar *kb* includes three lugs *dl* for actuating three rocker arms RA so that a switch of each group will be actuated in response to the push of each key.

Figure 5A:
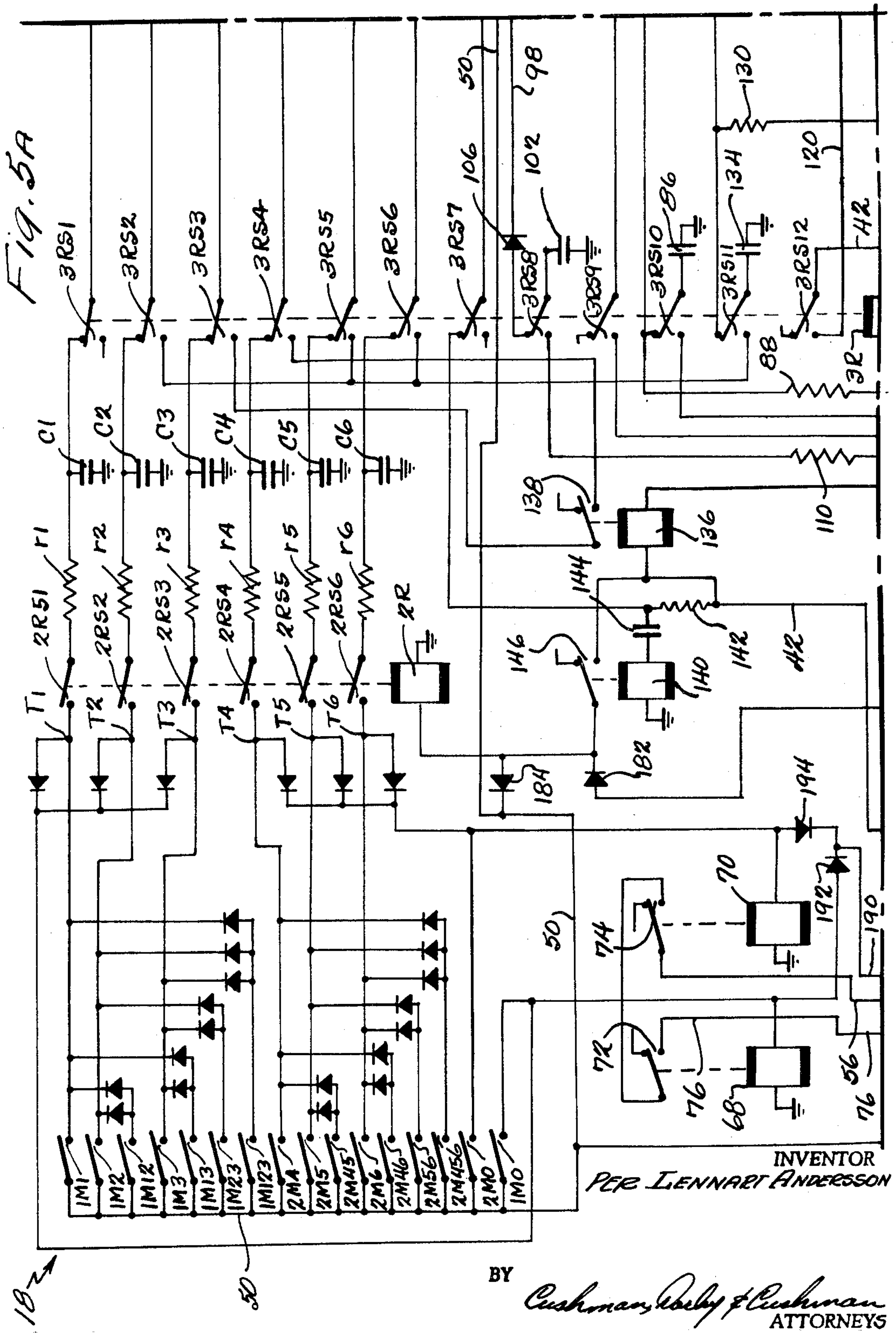
FIGURES 5A, 5B, 5C, and 5D are separate views illustrating four interrelated quadrants of the entire electric circuit of the keyboard apparatus of the present invention.

As best shown in FIGURE 5A, the first group of switches 1M are associated with punch channels 1, 2, and 3, and includes eight switches which represent the total number of different combinations and permutations of punches that can be made in channels 1–3. In FIGURE 5A the respective switches 1M have been provided with a subsequent reference numeral which corresponds with the respective channels which are punched in response to the actuation of the respective switch.

The second group of switches 2M are associated with punch channels 4, 5, and 6, and includes eight switches which represent the total number of different combinations and permutations of punches that can be made in channels 4–6. In FIGURE 5A the respective switches have been provided with a subsequent reference numeral which corresponds with the respective channels which are punched in response to the actuation of the respective switch.

The third group includes four switches 3M associated with the precedent code signals. While it is within the contemplation of the present invention to associate only a single precedent code signal with each of the four switches 3M, it is preferred to associate two precedent code signals with each of the switches 3M. By proceeding in this fashion the keyboard of the present invention is capable of producing a punch tape identical with the punch tapes which are capable of being received by existing computers, as, for example, the punch tape produced by a Teletypesetter keyboard. Thus, with this arrangement, each character code signal is associated with a shift or unshift precedent code signal and a rail or offrail precedent code signal. In FIGURE 5C, the switches 3M have been indicated with a following reference character designating the particular precedent code signals associated therewith. Thus, switch 3M*sr* is associated with the shift rail signal, switch 3M*ur* is associated with the unshift-rail signal, switch 3M*so* is associated with the shift-offrail signal, and switch 3M*no* is associated with the unshift-offrail signal.

Referring now more particularly to FIGURE 3, the tape punching mechanism 20 may be of any conventional construction, and, as schematically illustrated, includes a continuously operable electric motor 22 having an output shaft 24. Connected between the output shaft 24 and a cam shaft 26 is a single revolution clutch mechanism 28 of conventional construction adapted to be actuated by a solenoid $S_c$. The tape punching mechanism 20 also includes six punches, commonly indicated by the reference character P, followed by the numerals 1–6 corresponding with the respective channels 1–6. Associated with each punch is an actuating cam, indicated by the common reference character P*c* with a corresponding channel numeral, and an interposer mechanism, indicated by the common reference character P*i* with a corresponding channel numeral. Each interposer mechanism *Pi* is actuated by a solenoid, indicated by the common reference character S with a corresponding channel number, upon which energization will effect a punching movement of the associated punch P in response to a rotational movement of the associated cam P*c*. In accordance with conventional practice, in the absence of an energization of the associated solenoid S, the associated punch P will not be moved to punch during the revolution of the associated cam P*c*.

The tape punching mechanism also includes a tape advancing mechanism 30 which is operable in response to each rotation of the cam shaft 26 to move the tape forward a predetermined distance. The tape advancing mechanism 30 is of conventional construction and serves to advance the tape by engagement of the centrally located feed perforations F*p* in the tape T. Associated with the tape advancing mechanism is a tape sensing switch 32 which is normally closed when tape is contained in the tape punching mechanism 20, but is operable to open when there is no tape present on which the punches P can operate. Finally, the tape punching mechanism 20 also includes a switch 34 which is normally open and which is adapted to be momentarily closed during each revolution of the cam shaft 26, as by a cam 36.

Referring now more particularly to FIGURES 5A through D, the electric circuit 18 is preferably operable from a source of direct current, a main positive line 38 being shown in FIGURE 5D which feeds to a main positive lead 40 under the control of the switch 32. As shown, the main line 38 is connected to the switch arm and the lead 40 to the switch contact which is normally closed when tape is present in the tape punching mechanism, as aforesaid. For present purposes, switch 32 may be considered closed at all times.

The lead 40 feeds to a lead 42 under the control of a manual clear switch 44. As shown, the lead 40 is connected to the switch contact and the lead 42 is connected to the switch arm which is normally closed with respect to the contact. Positive current is transmitted to the switches 1M and 2M under the control of a switch 46 of a relay 48. As shown in FIGURE 5D, the lead 42 is connected with the switch contact and the switch arm is connected with a lead 50. The contacts of the switches 1M and 2M are normally open and when closed provide the impulse for energizing the solenoids S to punch the character code signal.

It will be understood that there are seven combinations and permutations of punch openings possible in channels 1, 2, 3 of the tape T (excluding a signal consisting of no punch openings at all therein). As shown in FIGURE 5A, these combinations and permutations are obtained as follows. The contact of switch 1M1 is connected to a terminal T1. This connection insures that when the contact is closed, an impulse will be available at terminal T1 when the portion of the character code within channels 1–3 is punched, which will result in the punching of an opening in channel 1. The contact of switch 1M2 is connected to a terminal T2 providing an impulse for a punch opening in channel 2. In a like manner, switch 1M12 is connected through suitable diodes to prevent current feedback from terminals T1 and T2 to provide an impulse at both of the terminals T1 and T2 and a punch opening in both the channels 1 and 2. The utilization of diodes to prevent feedback is preferable, although not essential, preferably a solid state diode, such as a silicon rectifier is utilized.

The switch 1M3 is connected directly to a terminal T3 to provide an impulse for the opening in channel 3. Switch 1M23 is connected through suitable diodes in parallel with terminals T2 and T3 while switch 1M123 is connected in parallel with all of the terminals T1, T2 and T3 through suitable diodes.

The connection of seven of the switches 2M to three additional terminals T4, T5, and T6 is similar to the connection of the above seven switches 1M to the terminals T1, T2, and T3 so that a further description of the same is not believed to be necessary. As before, the seven switches 2M connected with the terminals T4, T5, and T6 are provided with numerals indicating the terminal connection by numbers corresponding to the associated channels of the tape.

Each of the terminals T1 through T6 is connected in series with a switch, commonly indicated at 2RS of a six-switch relay, 2R, the six switches of the relay being provided in addition to the common reference character 2RS, a numeral 1 through 6 corresponding with the associated channel of the tape. Connected in series with each of the switches 2RS is a resistor (e.g. 100 ohms), indicated by the common reference character *r*, with a further number corresponding to the associated tape channel. Each of the resistors *r* is connected in parallel with a capacitor (e.g. .5 mf.), indicated by a common reference character *c*, and a further number corresponding to the number of the associated tape channel, and one switch commonly indicated at 3RS, of a 12-switch relay 3R, the switches of the relay 3R being provided with a further numeral from 1 through 12, the first six of which correspond with the number of the associated tape channel. Each of the relay switches 3RS1 through 3RS6 are connected in series respectively with a switch, commonly indicated by 4RS, or a second 12-switch relay 4R, shown in FIGURE 5B. The relays 3R and 4R are of similar construction and the switches 4RS of the relay 4R are designed with subscript numerals from 1 through 12, the first six switches including subscript numbers corresponding to the numbers of the associated tape channels.

Figure 5B:
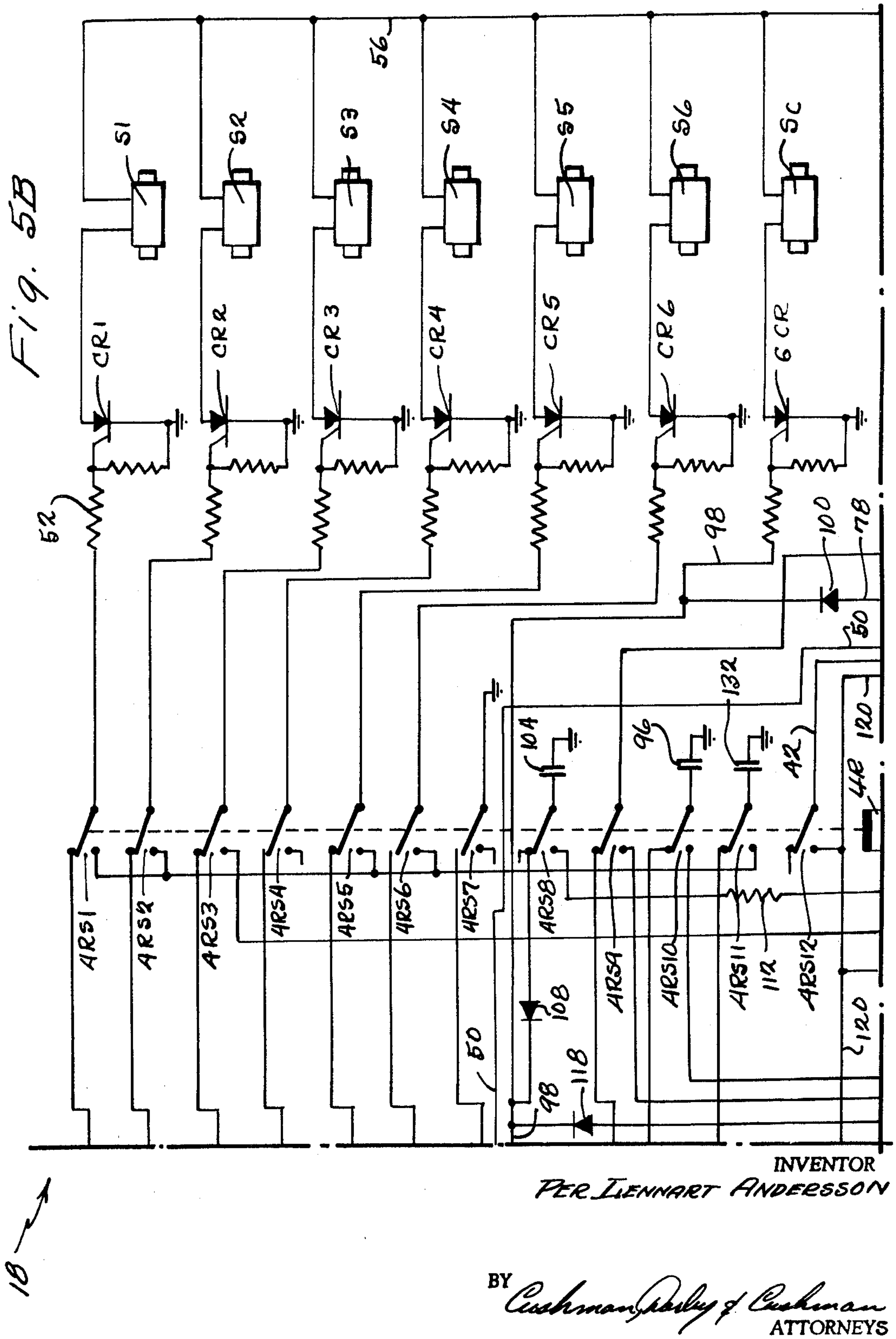
Figure 5C:
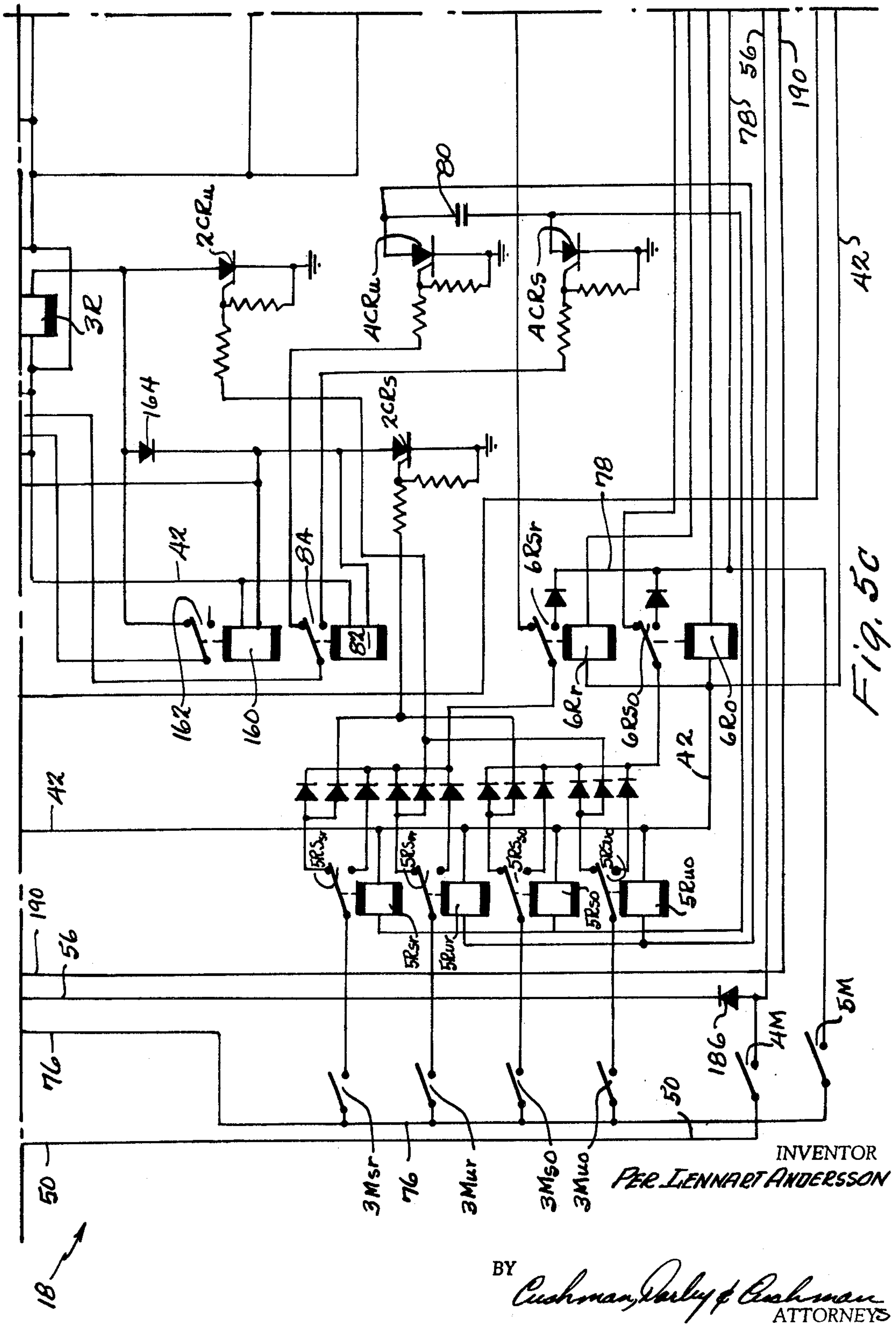
Figure 5I:
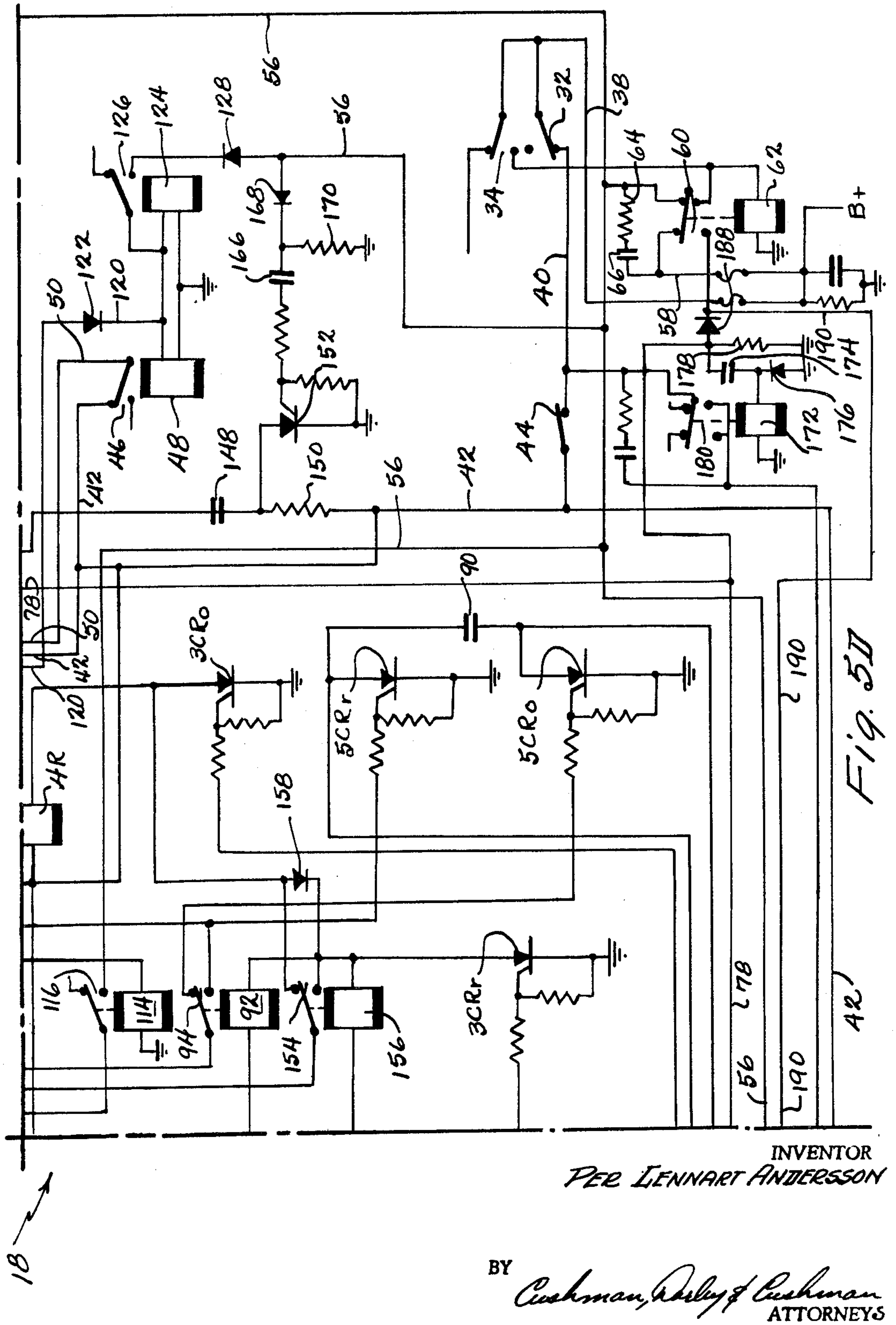

As shown in FIGURE 5B, each of the switches 4RS is connected to the gate of a silicon controlled rectifier, commonly indicated by the reference character CR, with a further numeral corresponding with the channel number. Each silicon controlled rectifier is biased by two resistors, one of which is connected in series with the gate of the rectifier CR and the other of which is connected from the gate to the cathode. An exemplary hook-up is shown in connection with CR1 wherein a biased resistor 52 connected in series with the gate has a resistance of, for example, 1500 ohms and a bias resistor 54 connected between the gate and the cathode has a resistance of, for example, 10,000 ohms. It will be understood that all of the silicon controlled rectifiers CR1–CR6 are connected in a similar manner. Moreover, throughout the description of the present electrical circuit 18, wherever a silicon controlled rectifier is utilized, it is connected with similar biased resistors.

It can thus be seen that the character code impulses from terminals T1–T6 will serve to turn on the respective rectifiers CR1–CR6 respectively and the turning on of the rectifiers serves to effect energization of the respective solenoids S1–S6. To this end, the positive current for energizing the respective solenoids S under the control of the respective rectifiers CR, is obtained from a lead 56 which, as shown in FIGURE 4D, receives positive current from a main line 58 under the control of a switch 60 of a relay 62. The switch 60 of the relay 62 includes a pair of normally closed and interconnected switch contacts which serve to connect the line 58 with the lead 56, respectively. To provide contact protection, a resistor 64 (e.g. 10 ohms) and capacitor 66 (e.g. .022 mf.) are preferably shunted in series across the main line 58 and lead 56. Thus, a positive current is normally available in line 56 and the anode of each rectifier CR is connected with the line 56 in series with the associated solenoid S. The operation of the rectifiers CR is such that the circuit to each solenoid S is interrupted until an impulse to the gate of the respective silicon controlled rectifier is received permitting current to flow from the anode to the cathode and to ground.

As was indicated above, such impulses may come from the terminals T1 through T6 in which case the energization of the respective solenoids will result in the punching of a character code signal. However, since the terminals T1 through T6 are connected in series both with the switches 3RS1–3RS6 and the switches 4RS1–4RS6, the circuitry is such that the impulse to turn on the rectifiers CR1–CR6 may come first through the switches 4RS1–4RS6 and/or the switches 3RS1–3RS6 depending upon whether one or two precedent code signals are to be punched preceding the character code signal. As previously indicated, each character code signal is associated with two precedent code signals so that if either one or both of the precedent code signals associated with the character code signal to be punched is different from either or both of the precedent code signals of the preceding character code signal, one or two precedent code signals will be punched prior to the punching of the character code signal.

Referring now more particularly to FIGURE 5C, switches 3M are utilized to control the actuation of relays 3R and 4R and to initiate the cycle of the tape punching mechanism 20. When either or both of the relays 3R and 4R are actuated a precedent code signal or signals will be punched prior to the punching of the character code signal, the actuation of the relays 3R and 4R serving also to recycle the tape punching mechanism so that the following precedent code signal and/or character code signal will be punched successively and automatically in response to the single push of a single key.

The switches 3M are preferably interlocked with the switches 1M and 2M so as to insure that a complete character code signal will be available prior to the initiation of the tape punching mechanism cycle in response to the closing of a switch 3M. To this end, the terminals T1, T2, and T3, and the associated contact of switch 1MO are connected in parallel with one side of the coil of a relay 68, the opposite side of which is connected with the ground. In order to prevent feedback to the terminals T1, T2, and T3, the parallel connection with each is provided with a diode in the form of a silicon rectifier or other equivalent structure. In a like manner, the terminals T4, T5, and T6 and the contact of switch 2MO are connected in parallel with one side of the coil of a relay 70, the opposite side of which is connected with the ground. As before, the connection with each of the terminals T4, T5, and T6 is provided with a diode in the form of a silicon rectifier to prevent current feedback to the terminals.

The relays 68 and 70 include switches 72 and 74, respectively, which are connected in series with the positive current lead 56 and with the switch arms of the switches 3M. As shown, the lead 56 is connected with the switch arm of the switch 74, the normally open contact of the switch 74 is connected to the switch arm of the switch 72 and the normally open contact of the switch 72 is connected with a lead 76 which provides positive current to the switch arms of the switches 3M in parallel when the contacts of both switches 72 and 74 are closed.

As was previously indicated, each key bar includes a lug which will close one of the switches 3M in response to the actuation of the key. The utilization of the interlock relays 68 and 70 to insure that the lug of the key bar which serves to close the switch 3M will not be effective to initiate the tape punching mechanism cycle until the other two lugs have closed one of the switches 1M and 2M, is of considerable importance in that it eliminates the necessity of accurate manufacture of the lugs and positioning of the switch contacts engaged thereby. It will be understood that in the absence of the interlock relays 68 and 70, and the availability of positive current to switches 3M simultaneously with the availability of positive current to the switches 1M and 2M might involve the intiation of the tape punching mechanism cycle prior to the closing of one of the switches 1M and 2M thus resulting in the possibility of the punch out of a faulty character code signal. Rather than to rely upon the physical simultaneous closing of each one of the switches 1M, 2M, and 3M by the lugs which would be subject to maladjustment, the provision of the interlock relays 68 and 70 insures the availability of a complete character code signal prior to the initiation of the tape punching mechanism cycle and eliminates the possibility of maladjustment.

The relay 3R is operable, when energized, to transmit the shift or unshift precedent code signal to the tape punching mechanism 20. The coil of the relay 3R is actuated under the control of one or the other of a pair of silicon controlled rectifiers, designated by the common reference character 2CR and with a following reference character *s* and *u*. As shown in FIGURE 5C, one side of the coil of the relay 3R is connected with the positive current lead 42 and the opposite side thereof is connected in parallel with the anodes of the respective rectifiers 2CR*s* and 2CR*u*.

It will be understood that when the rectifier 2CR*s* is turned on to actuate the coil of the relay 3R, a shift precedent signal will be transmitted to the tape punching mechanism 20, whereas when the rectifier 2CR*u* is turned on to actuate the coil of the relay 3R, an unshift precedent code signal will be transmitted to the tape punching mechanism.

The relay 4R is associated with the rail precedent code signals. As shown in FIGURE 5D, the coil of the relay 4R is actuated under the control of one or the other of a pair of silicon controlled rectifiers, designated by the common reference character 3CR with a following reference character *o* or *r*. As before, when the rectifier 3CR*r* is turned on to energize the coil of the relay 4R, a rail precedent code signal will be transmitted to the tape punching mechanism 30, whereas when the rectifier 3CR*o* is turned on to energize the coil of the relay 4R an off-rail precedent code signal will be transmitted to the tape punching mechanism.

As shown in FIGURE 5C, the impulse from any one of the switches 3M, when closed, is first controlled by a set of four interlocked relays, designated by the common reference character 5R and with a following reference character corresponding to the following reference character of the associated switch 3M. Each relay 5R includes a switch, designated by the common reference character 5RS and the associated following reference character. As shown, the contact of each switch 3M is connected with the switch arm of the associated switch 5RS. The normally closed contact fo each switch 5RS is connected with the gate of the associated shift signal rectifiers 2CR*s* or 2CR*u*, the normally closed contacts of the switches 5RS including the reference character being connected with the gate of the rectifier 2CR*s* and the normally closed contacts of the switches 5RS including the reference character *u* being connected with the gate of the rectifier 2CR*u*, each connection being provided with a diode such as a silicon rectifier to prevent feedback. In this way, the closed contact of each switch 5RS will serve to energize the shift-unshift signal relay 3R.

The energization of the rail-offrail signal relay 4R is also under the control of a pair of interlocked relays, designated by the common reference character 6R with a following reference character *o* associated with the offrail signal or *r* associated with the rail signal. Each relay 6R includes a switch, designated by the common reference character 6RS with a corresponding reference character *o* or *r*. The normally closed contact of each switch 5RS is also connected in parallel with a switch arm of a switch 6RS, the connection being made between the switches having a common reference character *o* or *r*. As before, each connection is provided with a diode to prevent feedback.

The normally closed contact of the switch 6RS*o* is connected to the gate of the rectifier 3CR*o*, while the normally closed contact of the switch 6RS*r* is connected with the gate of the rectifier 3CR*r*. The normally open contact of each switch 6RS is connected with a precedent code signal bypassing lead 78, each parallel connection including a diode to prevent current feedback. The normally open contact of each switch 5RS is connected in parallel with the switch arm of the switch 6RS having a following reference character the same as the following character of the switch 5RS. In this way, switches 5RS in their normally closed position will transmit the impulse from the associated switch 3M both to one of the rectifiers 2CR*s* or 2CR*u* and to the associated switch 6RS of the relay. The normally open contact of each switch 5RS, when closed, will transmit the impulse from the associated switch 3M to the associated switch 6RS.

The energization of the coils of the relays 5R determine whether the impulse from the switch 3M is directed to energize the shift-unshift signal relay 3R or is directed to the switches 6RS. Since two of the switches 3M are associated with the shift signal and the other two are associated with the unshift signal, an energization of the relay 3R is desired only when the shift or unshift signal changes. Consequently, the coils of the relays 5R*s* are connected in parallel and interlocked with the coils of the relay 5R*u*, which in turn are connected in parallel, so as to insure that when one of the relays 5R*s* is energized the other relay 5R*s* will likewise be energized and the two relays 5R*u* will not be energized. This function is accomplished by a pair of silicon controlled rectifiers, designated by the common reference character 4CR with a corresponding reference character *s* or *u*, as shown in FIGURE 5C.

As shown, each of the coils of the relays 5R*s* has one side thereof connected with the positive current lead 42 and the other side thereof connected with the anode of the rectifier 4CR*s*, while each of the coils of the relays 5R*u* has one side connected with the positive current lead 42 and the other side connected with the anode of the rectifier 4CR*u*. The anodes of the rectifiers 4CR are interconnected by an interlocking capacitor 80.

The rectifiers 4CR are turned on in response to the actuation of the relay 3R through the control of a relay 82. As shown, one side of the coil of the relay 82 is connected with the positive current lead 42, while the other side is connected with the anode of the rectifier 2CR*s* so that the coil will be energized when the rectifier 2CR*s* is turned on. Relay 82 includes a switch 84, the normally closed contact of which is connected with the gate of the rectifier 4CR*u* and the normally open contact of which is connected to the gate of the rectifier 4CR*s*. The switch arm of the switch 84 is connected to the normally open contact of the switch 3RS10 of the relay 3R, as shown in FIGURE 5A. The switch arm of the switch 3RS10 is connected to ground in series with a capacitor 86 (e.g. 1 mf.) and the normally closed contact thereof is connected with the positive current lead 42 in series with a resistor 88 (e.g. 100 ohms).

The energization of the coils of the relays 6R determine whether the impulse transmitted to the switches 6RS are directed to energize the rail-offrail signal relay 4R or to energize the bypass lead 78. Since two of the switches 3M are associated with the rail signal and the other two are associated with the offrail signal, an energization of the relay 4R is desired only when the rail or offrail signal changes. Consequently, the coils of the relay 6R*r* and 6R*o* are interlocked so as to insure that when one of the relays is energized the other will not be energized. This function is accomplished by a pair of silicon controlled rectifiers, designated by the common reference character 5CR with a corresponding reference character *r* or *o*, as shown in FIGURE 5D.

As shown, the coil of the relay 6R*r* has one side thereof connected with the positive current lead 42 and the other side thereof connected with the anode of the rectifier 5CR*r*, while the coil of the relay 6R*o* has one side connected with the positive current lead 42 and the other side connected with the anode of the rectifier 5CR*o*. The anodes of the rectifiers 4CR are interconnected by an interlocking capacitor 90.

The rectifiers 4CR are turned on in response to the actuation of the relay 4R through the control of a relay 92. As shown, one side of the coil of the relay 92 is connected with the positive current lead 42 while the other side is connected with the anode of the rectifier 3CR*r* so that the coil will be energized when the rectifier 3CR*r* is turned on. Relay 92 includes a switch 94, the normally closed contact of which is connected with the gate of the rectifier 5CR*o* and the normally open contact of which is connected to the gate of the rectifier 5CR*r*. The switch arm of the switch 94 is connected to the normally open contact of the switch 4RS10 of the relay 4R, as shown in FIGURE 5B. The switch arm of the switch 4RS10 is connected to ground in series with a capacitor 96 and the normally closed contact thereof is connected with the positive current lead 42 in series with the resistor 88.

As best shown in FIGURE 5B, the clutch actuating solenoid Sc which serves to initiate the cycle of the tape punching mechanism 20 is energized under the control of a silicon controlled rectifier 6CR, the solenoid Sc being connected across the positive current lead 56 and ground in series with the anode of the rectifier 6CR. The gate of the rectifier 6CR is connected with a lead 98 which is connected with the bypass lead 78 through a diode 100 which prevents feedback of current through the lead 78. Thus, an initiating impulse for the tape punching mechanism 20 will be transmitted to lead 98 whenever the impulse from the switch 3M is directed, by the relay 6R, to the bypass lead 78. The impulse in line 98 to turn on the rectifier 6CR and effect recycling of the tape punching mechanism when either or both of the relays 3R and 4R are energized comes from the switches 3RS8 and 4RS8 thereof respectively. As shown, the switch arms of the switches 3RS8 and 4RS8 are connected to ground in series with capacitors 102 and 104, respectively (e.g. 0.1 mf.). The normally closed contacts of the switches 3RS8 and 4RS8 are connected with the lead 98 in series with diodes 106 and 108, respectively. The normally open contacts of the switches 3RS8 and 4RS8 are connected with the positive current lead 42 in series with resistors 110 and 112, respectively (e.g. 100 ohms).

In order to provide an impulse to lead 98 to initiate the cycle of the tape punching mechanism when bypass lead 78 is not energized, a relay 114 is provided (see FIGURE 5D). Relay 114 includes a normally open switch 116 which, when closed, serves to connect positive current lead 56 with the lead 98 in series with a diode 118. The coil of the relay 114 is connected between a lead 120 and ground, the lead 120 being connected in turn with the normally open contacts of the switches 3RS12 and 4RS12. As shown, the switch arms of the switches 3RS12 and 4RS12 are connected with the positive current lead 42 so that when either or both of the relays 3R and 4R are energized, relay 114 will be energized to complete the circuit to the clutch actuating rectifier 6CR.

As shown in FIGURES 5B and 5D, the lead 120 is also connected to one side of the coil of the relay 48 in series with a diode 122, the opposite side of the coil being connected to ground. With this arrangement, when either of the relays 3R or 4R is energized, the coil of the relay 48 will likewise be energized to open the switch 46. Opening of the switch 46 cuts off the flow of positive current to the microswitches M1 and M2 so that the keyboard cannot be again actuated so that a push on the key will not result in actuation of the circuitry until the punch cycle is completed in response to the single push of the previous key pushed.

In this regard, a holding relay 124 is provided, the coil of which is connected in parallel with the coil of the relay 48 to be energized therewith. The holding relay 124 includes a normally open switch 126 which, when closed, serves to connect the sides of the coils 48 and 124 opposite from the ground side thereof with the positive current line 56 in series with a diode 128.

Referring now to FIGURE 5A, it will be noted that the switches 2RS are normally open so that the character code signals transmitted immediately to the terminals T can not be transmitted to the solenoid actuating rectifiers CR until relay 2R is energized. If a precedent code signal is to be punched, this signal is preferably transmitted to the solenoid actuating rectifiers CR prior to the character code signal. To accomplish this function, the energization of the relay 4R is utilized to sequentially interrupt the circuit from the relay switches 2RS to the rectifiers CR and to transmit the precedent code signal, either rail or offrail, to the rectifiers CR and at the same time energize the coil of relay 2R to close the switches 2RS thereof and transmit the character code signal at the terminals T for storage to the capacitors *c*.

The rail or offrail precedent code signal is generated in response to the energization of relay 4R through switch 4RS11. As shown in FIGURE 5B, the normally closed contact of the switch 4RS11 is connected with the positive current lead 42 in series with a resistor 130 (e.g. 100 ohms see FIGURE 5A) and the switch arm is connected to the ground in series with a capacitor 132 (e.g. 10 mf). The normally open contact of the switch 4RS11 is connected in parallel with the normally open contacts of the switches 4RS1, 4RS2, 4RS5, and 4RS6, which determines an offrail character code signal of 1256. The rail code is 12356, the 3 signal being added by connecting the normally open contact of switch 4RS3 with the gate of rectifier 5CR*r*.

Since the closed contacts of the switches 4RS1–4RS6 are connected directly to the switch arms of the switches 3RS1–3RS6, respectively, energization of the relay 4R also serves to prevent transmission of a shift or unshift signal in the event that relay 3R is energized simultaneously with relay 4R. The shift-unshift signal is stored during the punching of the rail-offrail signal and transmitted to the solenoid actuating rectifiers CR under the control of switch 3RS11 after the relay 4R has been deenergized. Switch 3RS11 is connected in a manner similar to the switch 4RS11, the normally closed contact thereof being connected with the resistor 130 and the switch arm thereof being connected to ground in series with a capacitor 134. The normally open contact of the switch 3RS11 is connected in parallel with the normally open switch contacts of the switches 3RS2, 3RS3, 3RS5, and 3RS6, which determines an unshift precedent code signal of 2356. The shift signal is 23456 and the added 4 signal is supplied under the control of a relay 136. As shown in FIGURE 5A, one side of the coil of the relay 136 is connected with the positive current line 42 and the other side thereof is connected with the anode of the rectifier 2CR*s*. Relay 136 includes a normally open switch 138 which, when closed, serves to connect the normally open contact of the switch 3RS11 with the normally open contact of the switch 3RS4.

The relay 2R is energized in response to the energization of either relay 3R or 4R through the operation of relay switches 3RS7 and 4RS7, respectively, which in turn serve to control a relay 140. As shown in FIGURE 5A, one side of the coil of the relay 140 is connected with the positive current lead 42 in series with a resistor 142 (e.g. 2700 ohms) and a capacitor 144 (e.g. 1.0 mf.), the opposite side of the coil being connected with the ground. The series circuit including the resistor 142 and capacitor 144 is connected between the resistor and the capacitor in parallel with the ground through the normally closed contacts of the switches 3RS7 and 4RS7. With this arrangement, an interruption of the current to the ground by opening either switch 3RS7 or 4RS7 will result in a charging of the capacitor 144, which, in turn, will energize the coil of the relay 140 during the charging of the capacitor. The relay 140 includes a normally open switch 146 which, when closed, serves to connect the coil of the relay 2R across the positive current lead 42 and the ground.

As shown in FIGURE 5D, the relays 3R and 4R are deenergized by a knock-off capacitor 148 (e.g. .47 mf.) which, in turn, is cycled in response to the closing of the switch 34 in the middle of each cycle of the tape punching mechanism 20. To this end, one side of the capacitor 148 is connected with the positive current lead 42 in series with a resistor 150 (e.g. 33000 ohms). The series circuit between the resistor 150 and capacitor 148 is connected in parallel with the anode of a silicon controlled rectifier 152 so that when the rectifier 152 is on, the knock-off capacitor 148 will be discharged and when the rectifier 152 is off, the capacitor 148 is capable of being charged when the other side thereof is connected to ground. The charging of the capacitor 148 is utilized as the impulse to knock-off the rectifiers 2CR*s* or 2CR*u* which control the energization of the relay 3R and to knock-off the rectifiers 3CR*r* and 3CR*o* which control the energization of the relay 4R. The knock-off impulse is directed to the gates of the respective rectifiers under the control of switches 4RS9 and 3RS9.

As shown in FIGURES 5D and 5B, the opposite side of the capacitor 148 is connected with the switch arm of the switch 4RS9, the normally open contact of which is connected with the switch arm of a switch 154 of a relay 156. The normally closed contact of the switch 154 is connected to the anode of the rectifier 3CR*o* and in parallel with the anode of the rectifier 3CR*r* in series with a diode 158. The normally open contact of the switch 154 is connected with the anode of the rectifier 3CR*r*, the diode 158 serving to prevent transmission of current to the anode of the rectifier 3CR*o*. With this arrangement, the knock-off impulse will be transmitted to the anode of the rectifier 3CR*o* in response to the energization of the relay 4R by the rectifier 3CR*o* to immediately knock-off the same and deenergize the relay 4R. On the other hand, when rectifier 3CR*r* is turned on to energize the relay 4R, the coil of the relay 156 is connected between the positive current lead 42 and the anode of the rectifier 3CR*r* so as to be energized simultaneously with the energization of relay 4R so that, when the knock-off impulse is received, it will be directed to the anode of the actuating rectifier 3CR*r* to knock-off the same and deenergize the relay 4R.

The normally closed contact of switch 4RS9 is connected with the switch arm of the switch 3RS9 so that if both relays 3R and 4R are simultaneously energized, the first knock-off impulse will be transmitted to knock-off the rectifier 3CR controlling the relay 4R. After the relay 4R has been deenergized the next knock-off impulse can then be transmitted to the rectifiers 2CR controlling the energization of the relay 3R. To this end, there is provided a relay 160, as shown in FIGURE 5C, similar to the relay 154. As shown, the relay 160 includes a switch 162, the switch arm of which is connected to the normally open contact of switch 3RS9. The normally closed contact of switch 162 is connected with the anode of the rectifier 2CR*u* and in parallel with the anode of the rectifier 2CR*s* in series with a diode 164. The normally open contact of the switch 162 is connected to the anode of the rectifier 2CR*s* in a manner similar to the normally open contact of the switch 154. The coil of the relay 160 is connected between the positive current lead 42 and the anode of the rectifier 2CR*s* in a manner similar to the coil of the relay 156.

Referring again to FIGURE 5D, the rectifier 152 is turned on to discharge the knock-off capacitor 148 and then turned off to permit a charge cycle thereof by means of a capacitor 166 (e.g. .047 mf.) having one side thereof connected to the gate of the rectifier 152 and the opposite side thereof connected with the lead 56 in series with a diode 168. The series circuit is connected in parallel to the ground between the capacitor 166 and the diode 168 in series with a resistor 170 (e.g. 78,000 ohms). With this arrangement, when lead 56 is deenergized in response to the energization of the coil of the relay 62 when switch 34 closes, capacitor 166 will be charged. The charging of the capacitor 166 turns on the rectifier 152, resistor 150 preventing the rectifier from staying on. The momentary turning on of the rectifier 152 thus discharges the knock-off capacitor 148 permitting the same to be charged in the manner indicated above to provide a knock-off impulse to the relay controlling rectifiers in response to the energization of the relays, as aforesaid.

It can thus be seen that when either or both of the relays 3R or 4R are energized, the respective precedent code signal will be punched prior to the punching of the associated character code signal. In the event that neither of the relays 3R or 4R are energized in response to the push of a key (as when the previous key is associated with the same two precedent code signals), it has been seen that the impulse generated as a result of the closing of the associated switch 3M will bypass the relays and be transmitted directly to the rectifier 6CR controlling the clutch solenoid S*c*. This same impulse is also utilized to energize the relay 2R so as to permit the character code signal to be transmitted to the rectifiers CR.

This function is accomplished by means of a relay 172, as shown in FIGURE 5D. One side of the coil of the relay 172 is connected to ground while the other side is connected with the lead 78 in series with a capacitor 174 (e.g. 1.0 mf.). The series circuit between the capacitor 174 and the coil of the relay 172 is connected in parallel with the ground in series with a diode 176 preventing flow of current to the ground. The opposite side of the capacitor 174 also includes a parallel connection to ground in series with a resistor 178 (e.g. 1000 ohms). With this arrangement, the coil of the relay 172 will be energized only when the capacitor 174 is chargeable and charging, which is of the order of 4 to 5 milliseconds. The relay 172 includes a normally open switch 180, which, when closed in response to the energization of the coil of the relay 172, completes a circuit through a diode 182 from the positive current lead 40 through the coil of the relay 2R to ground (see FIGURES 5C and 5A). Preferably, a contact protecting shunt circuit similar to that provided for switch 60 is also provided for switch 180. It will also be noted that the circuit between the diode 182, as shown in FIGURE 5A, and the advanced end of the coil of the relay 2R is connected with the lead 50 in series with a diode 184 preventing feedback of current from the lead 50.

In order to provide special functions, in addition to the switches 1M, 2M and 3M there is provided two additional switches 4M and 5M. As shown in FIGURE 5C, the switch arm of the microswitch 4M is connected with the the lead 50 and the normally open contact thereof is connected with the lead 56, a diode 186 being connected in the lead 56 between the connection of the open switch contact of the switch 4M and the switch 74.

The switch arm of the switch 5M is connected in parallel with the switch arms of the switches 3M and the normally open contact thereof is connected with the lead 78.

Switch 4M, when closed, provides a repeating function which can be accomplished either by providing a separate key which must be actuated simultaneously with the character key to close the switch 4M or by providing a specific character key with an additional lug *dl* which simultaneously actuates the switch 4M along with the respective switches 1M, 2M, and 3M.

The switch 5M provides the function of by-passing the precedent code relays 3R and 4R so that when closed, will directly transmit an impulse to initiate the cycle of the tape punching mechanism 20 in conjunction with the closing of switch 4M as when a character code signal is to be repeated without a precedent code signal. In addition, switch 5M is utilized in conjunction with a tape advancing key so that the tape punching mechanism can be cycled to advance the tape without actuating the punches thereof. To this end, lead 78 is connected with one normally open contact of the switch 60 in series with a diode 188. A lead 190 is connected in the series circuit between the diode 188 and the normally open contact of the switch 60. As shown in FIGURE 5A, the side of the coil of each relay 68 and 70 opposite from the ground is connected in parallel with the lead 190 in series with diodes 192 and 194, respectively, preventing feedback from lead 190 to the relay coils. The opposite normally open contact of the switch 60 is connected with the side of the coil of the relay 62 opposite from the ground side thereof.

*Operation*

It is preferable in commencing operation of the keyboard apparatus of the present invention to actuate the manual clear switch 44. This has the effect of deenergizing the coils of the relays which control the actuation of the precedent code signal relays 3R and 4R. This insures that both precedent code signals will be punched in association with the punching of the first character code signal. Consequently, in describing the operation of the present apparatus, it will be assumed that all of the relays are disposed in their normal positions. In commencing operation it is assumed that the operator first pushes the single key shown in FIGURE 2. The lugs of the key bar associated with this key are positioned to actuate microswitches 1M3, 2M4, and 3M*sr*.

The closing of microswitches 1M3 and 2M4 energize relays 68 and 70 closing switch contacts 72 and 74, which, in turn, provides positive current to the switch arm of the switch 3M*sr* so that as the latter is closed a circuit is completed through the normally closed contact of switch 5RS*sr*: (1) to turn on rectifier 2CR*s*; and (2) to turn on rectifier 3CR*r* through the normally closed contact of switch 6RS*r*.

The simultaneous turning on of the rectifiers 2CR*s* and 3CR*r* simultaneously energize the relays 3R and 4R. The energization of the relays 3R and 4R accomplishes the following functions:

(1) Energizes relay 140 through the operation of switches 3RS7 and 4RS7 and capacitor 144, closing switch 146 to complete the circuit through the coil of the relay 2R. The energization of the relay 2R closes switches 2RS permitting the impulses resulting from the closing of switches 1M3 and 2M4 to charge capacitors *c*3 and *c*4;

(2) Interrupts the circuit between switches 3RS1–3RS6 and the solenoid actuating rectifiers CR1–CR6 and connects capacitor 132 through switch 4RS11 with the gates of rectifiers CR1, CR2, CR5, and CR6 by means of switches 4RS1, 4RS2, 4RS5, and 4RS6, respectively;

(3) Charges capacitors 102 and 104 through the operation of switches 3RS8 and 4RS8, respectively;

(4) Discharges capacitor 86 through switch 3RS10 to turn on rectifier 4CR*s* (the coil of relay 82 being energized when rectifier 2CR*s* is turned on) which in turn energizes relays 5RS*r* and 5RS*o*;

(5) Discharges capacitor 96 through switch 4RS10 to turn on rectifier 5CR*r* (the coil of relay 92 being energized when rectifier 3CR*r* was turned on) which, in turn, energizes relay 6R*r*;

(6) Energizes the coil of relay 48 to interrupt the current to the switches 1M and 2M through switches 3RS12 and 4RS12 and simultaneously energizes holding relay 124 to maintain the coil of relay 48 energized;

(7) Energizes the coil of relay 114 through switches 3RS12 and 4RS12 to turn on rectifier 6CR which in turn energizes solenoid S*c* to initiate the cycle of the tape punching mechanism; and (8) Transmits a knock-off impulse from knock-off capacitor 148 through switch 4RS9 to the anode of rectifier 3CR*r* to turn off the rectifier and deenergize relay 4R.

During the tape punching mechanism cycle thus initiated, the rail precedent code 1256 will be punched. In the middle of the cycle, switch 34 is closed energizing the coil of relay 62 which recycles the knock-off capacitor 148 and turns off the rectifiers CR1, CR2, CR5, CR6 and 6CR.

The deenergization of the relay 4R has the following functions:

(1) Recharges the capacitors 96 and 132 through the operation of switches 4RS10 and 4RS11, respectively;

(2) Connects the capacitor 134 by means of switch 3RS11 to the gates of the rectifiers CR2, CR3, CR4, CR5 and CR6, through switches 3RS2, 3RS3 (switch 138 having been closed in response to the energization of the coil of relay 136 when rectifier 2CR*s* was turned on), 3RS4, 3RS5 and 3RS6;

(3) Discharges capacitor 104 through switch 4RS8 to turn on rectifier 6CR to initiate another cycle of the tape punching mechanism 20 by energizing clutch solenoid S*c*; and (4) Transmits a knock-off impulse from the knock-off capacitor 148 through switches 4RS9 and 3RS9 to turn off rectifier 2CR*s* and deenergize relay 3R (the relay 160 having been energized in response to the turning on of rectifier 2CR*s*.

During the next cycle of the tape punching mechanism the shift precedent code 23456 will be punched and in the middle of this cycle, switch 34 closes to energize relay 62 which, in turn, recycles the knock-off capacitor 148 and turns off the rectifiers CR2, CR3, CR4, CR5, CR6 and 6CR.

The deenergization of the relay 3R accomplishes the following functions:

(1) Recharges capacitors 86 and 134 through the operation of switches 3RS10 and 3RS11;

(2) Interrupts through switch 3RS12 direct energization of the relay 148 leaving the coil thereof energized by the holding relay 124;

(3) Deenergizes relay 114;

(4) Discharges capacitor 144 through the switches 3RS7 and 4RS7;

(5) Connects charged capacitors *c3* and *c4* to the gates of the rectifiers CR3 and CR4;

(6) Discharges the capacitor 102 through switch 3RS8 to turn on rectifier 6CR to initiate another cycle of the tape punching mechanism.

During the last cycle of the tape punching mechanism the character code 34 will be punched and in the middle of this cycle switch 34 closes to energize relay 62 to recycle the knock-off capacitor 148 and turn off the rectifiers CR3, CR4 and 6CR.

It will be noted that as a result of the above operation, all of the relays 5R and 6R having a subscript reference character of either *s* (for shift) or *r* (for rail) remain energized. Consequently, if the next key punched actuates the switch 3M*sr*, no precedent signal will be punched and the impulse from the closing of the switch 3M*sr* will be transmitted directly to the bypass line 78 to turn on rectifier 6CR and initiate the punching cycle. The impulse in lead 78 also serves to energize relay 172 so as to provide a source of positive current which will energize relay 2R. Since relays 3R and 4R remain unenergized, the energization of relay 2R results in the direct transmission of the character code signal to the gates of the respective rectifiers CR1 through CR6 so that only the respective character code signal is punched during the cycle of the tape punching mechanism.

It can be seen that if the next key punched closes switch 3M*ur*, the impulse from the closing of this switch will be directed: (1) to the gate of the rectifier **2CR*u* to turn on the same and energize relay 3R; and (2) to the lead 78** thus bypassing the relay 4R.

As before the impulse in lead 78 serves to initiate the cycle of the tape punching mechanism 20 and to energize the relay 2R. However, since unshift precedent code signal relay 3R is energized substantially simultaneously with the energization of the clutch solenoid S*c*, the unshift precedent code signal 2356 will be punched. The energization of the relay 3R functions as previously described so that during the next cycle of the tape punching mechanism the particular character code signal will be punched. During this cycle, however, it will be noted that the discharge of the capacitor 86 will turn on the rectifier 4CR*u* rather than the rectifier 4CR*s* since relay 82 is not energized. The turning on of rectifier 4CR*u* turns off rectifier 4CR*s* resulting in the deenergization of relays 5RS*r* and 5RS*o* and the energization of the relays 5R*ur* and 5R*uo*. Also No. 4 signal is punched since relay 136 is not energized.

In the event that the next key pushed closes switch 3M*uo*, the impulse from the closing of the switch will be directed through energized relay 5R*uo* and deenergize relay 6R*o* to turn on rectifier 3CR*o* to energize relay 4R. The energization of relay 4R accomplishes the functions described above so that the tape punching mechanism will initially be cycled to punch the offrail precedent code signal 1256 (No. 3 signal is punched since relay 92 is not energized). It will also be noted that the discharge of capacitor 96 will serve to turn on rectifier 5CR*o* rather than rectifier 5CR*r*, since relay 92 is not energized. Turning on of rectifier 5CR*o* functions to energize relay 6R*o* and deenergize relay 6R*r*.

It can thus be seen that the keyboard apparatus of the present invention is operable to punch a complete command code signal in response to a single push of a single key. This command code signal consists of (1) a rail or offrail precedent code signal but only if the rail or offrail precedent code signal associated with the key pushed differs from the rail or offrail precedent code signal associated with the previous key pushed; (2) a shift or unshift precedent code signal but only if the shift or unshift precedent code signal associated with the key pushed is different from the shift or unshift precedent code signal associated with the previous key pushed; and (3) a character code signal.

In addition to the above, it will be noted that any key provided with an additional lug for actuating the switch 4M can, by maintaining such key in its depressed position, operate to repeat the character code signal until released. The switch 4M permits a new initiation impulse to be transmitted through the closed switch 3M, which impulse normally cannot be transmitted due to the energization of the relay 62 in response to the closing of switch 34. Switch 4M bypasses relay 62 and the lead 190 serves to maintain the coil of the relay 62 energized.

A special tape advancing key would include four lugs adapted to actuate switches 1MO, 2MO, 4M and 5M.

An advance key of this type would continue to cycle the tape punching mechanism 20 so long as held in a depressed position without punching any signals, the connection of the switch 5M bypassing the precedent code signal relays 3R and 4R and going directly to the lead 78.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A tape punching keyboard apparatus comprising a multiplicity of keys mounted for movement by a digital push, a tape punching mechanism including a plurality of punches for punching a line of openings in a tape in different combinations and permutations constituting different code signals, the total number of code signals being substantially less than the total number of keys, all but a few of said code signals serving as character code signals, four of the remaining code signals serving as precedent code signals, each key being associated with a distinct command code signal which includes a single character code signal, a first precedent code signal from a first pair of associated precedent code signals and a second precedent code signal from a second pair of associated precedent code signals, and means operable in response to a single push of a single key for actuating said tape punching mechanism (1) to punch the character code signal portion of the distinct command code signal associated with the key pushed on a separate punch line (2) to adjacently punch the first precedent code signal portion of said command code signal only if the first precedent code signal portion of the command code signal associated with the preceding key pushed is different, and (3) to adjacently push the second precedent code signal portion of said command code signal only if the second precedent code signal portion of the command code signal associated with the preceding key pushed is different.

2. A tape punching keyboard apparatus comprising a multiplicity of keys mounted for movement by a digital push, a tape punching mechanism including a plurality of punches for punching a line of openings in a tape in different combinations and permutations constituting different code signals, the total number of code signals being substantially less than the total number of keys, all but a few of said code signals serving as character code signals, four of the remaining code signals serving as precedent code signals, each key being associated with character and precedent code signals constituting a distinct command code signal, and means operable in response to a single push of a single key for actuating said tape punching mechanism to punch the character code signal portion of the distinct command code signal associated with the key pushed on a separate punch line and to adjacently punch a precedent code signal portion of said command code signal only if a precedent code signal portion of the command code signal associated with the preceding key pushed is different, said actuating means including means operable in response to an initiating electrical impulse for actuating said tape punching mechanism in an operating cycle associated with a single punch line, and means operable in response to an electrical code signal for effecting the operation of said punches during an operating cycle of said tape punching mechanism to punch a code signal in the single punch line corresponding to said electrical code signal.

3. Apparatus as defined in claim 2 wherein each command code signal includes a single character code signal, a first precedent code signal from a first pair of associated precedent code signals, and a second precedent code signal from a second pair of associated precedent code signals, and wherein said actuating means further includes means for generating a first electrical precedent code signal corresponding to the first precedent code signal associated with the key pushed when the latter is different from the first precedent code signal associated with the preceding key pushed, means for generating a second electrical precedent code signal corresponding to the second precedent code signal associated with the key pushed when the latter is different from the second precedent code signal associated with the preceding key pushed, means for transmitting an initiating electrical impulse to said initiating impulse responsive means in response to the push of the key pushed to initiate a first operating cycle of said tape punching mechanism, means for transmitting a first electrical precedent code signal generated by said first electrical precedent code signal generating means to said electrical code signal responsive means during the first operating cycle of said tape punching mechanism and for transmitting initiating electrical impulse to said initiating impulse responsive means to initiate a second operating cycle of said tape punching mechanism, means for transmitting a second electrical precedent code signal generated by said second precedent code signal generating means to said electrical code signal responsive means alternatively during the first operating cycle of said tape punching mechanism when no first electrical precedent code signal is transmitted or during the second operating cycle of said tape punching mechanism when a first electrical precedent code signal is transmitted and for transmitting an initiating electrical impulse to said initiating impulse responsive means to initiate either a third operating cycle or a second operating cycle respectively of said tape punching mechanism, means for generating an electrical character code signal corresponding to the character code signal associated with the key pushed, and means for transmitting the electrical character code signal to said electrical code signal responsive means alternatively during the third operating cycle of said tape punching mechanism when a first and second electrical precedent code signal is transmitted, during the second operating cycle of said tape punching mechanism when either a first or a second electrical precedent code signal is transmitted and during the first operating cycle of said tape punching mechanism when no first or second electrical precedent code signal is transmitted.

4. Apparatus as defined in claim 3 wherein said actuating means further includes selectively operable means for rendering both said first and second electrical precedent code signal generating means operable to generate the associated electrical precedent code signal without regard to the first and second precedent code signals associated with the preceding key pushed.

5. Apparatus as defined in claim 3 wherein said electrical character code signal generating means includes a series of character code signal switches, and wherein said first and second electrical precedent code generating means includes a series of precedent code signal switches, a keybar associated with each key mounted for movement from an inoperative position into an operative position in response to the push of the associated key, each of said keybars having a plurality of spaced lugs thereon positioned to correspond with the command code signal associated with the associated key for actuating corresponding character code switches and precedent code switches in response to the movement of the keybar into its operative position.

6. Apparatus as defined in claim 5 wherein said actuating means further includes means for preventing transmission of an initiating electrical impulse by said initiating electrical impulse transmitting means until all of the character code signal and precedent code signal switches have been actuated by the lugs of the associated keybar of the key pushed.

7. Apparatus as defined in claim 3 wherein the number of punches is 6 and the number of keys is of the order of 236.

8. Apparatus as defined in claim 2 wherein said actuating means further includes means for generating an electrical precedent code signal portion of the command code signal corresponding to the precedent code signal portion of the command code signal associated with the key pushed when the latter is different from the precedent code signal portion of the command code signal associated with the preceding key pushed, means for transmitting an electrical impulse to said initiating impulse responsive means in response to the push of the key pushed to initiate a first operating cycle of said tape punching mechanism means for transmitting an electrical precedent code signal portion generated by said electrical precedent code signal portion generating means to said electrical code signal responsive means during the first operating cycle of said tape punching mechanism and for transmitting an initiating electrical impulse to said initiating impulse responsive means at the completion of the punching of the precedent code signal portion of the command code signal to initiate a subsequent operating cycle of said tape punching mechanism means for generating an electrical character code signal corresponding to the character code signal portion of the command code signal associated with the key pushed, and means for transmitting the electrical character code signal to said electrical code signal responsive means alternatively during the first operating cycle of said tape punching mechanism when no electrical precedent code signal portion is transmitted and during said subsequent operating cycle when an electrical precedent code signal portion is transmitted.

9. Apparatus as defined in claim 8 wherein said actuating means further includes selectively operable means for rendering said electrical precedent code signal portion generating means operable to generate the corresponding electrical precedent code signal portion without regard to the precedent code signal portion of the command code signal associated with the preceding key pushed.

10. Apparatus for punching tape comprising a multiplicity of key bars mounted for movement between first and second positions, a key for each key bar mounted for digital movement from a normally biased raised position into a depressed position, means for effecting movement of each key bar from said first position to said second position in response to the digital movement of the associated key into its depressed position, each of said key bars having a plurality of spaced lugs thereon, the positioning of the lugs of each key bar being different and corresponding with a distinct command code signal, a tape punching mechanism operable in response to an initiating electrical impulse to punch a series of openings in a tape representing a command code signal, a series of switches, means operatively connected between said switches and said key bar lugs as determined by the distinct positioning thereof for actuating a distinct combination of switches in response to the movement of a key bar into its second position, means operable in response to each actuation of each combination of switches for conditioning said tape punching mechanism to punch a series of openings representing a distinct command code signal in response to the initiating electrical impulse, and means for transmitting an initiating electrical impulse to said tape punching mechanism only in response to the actuation of the entire combination of switches so as to insure that said tape punching mechanism will be operated to punch a series of openings only when the entire combination of switches have been actuated to properly condition the same.

References Cited

UNITED STATES PATENTS

| | | | |
|---|---|---|---|
| 1,256,801 | 2/1918 | Indahl | 234—124 X |
| 2,882,972 | 4/1959 | Salmon | 234—103 X |
| 2,902,092 | 9/1959 | Hildebrandt | 234—23 |
| 3,021,998 | 2/1962 | Brewer | 234—23 X |
| 3,050,241 | 9/1962 | Hickerson | 234—23 |

WILLIAM S. LAWSON, *Primary Examiner.*